United States Patent
Inoue

(10) Patent No.: US 7,293,877 B2
(45) Date of Patent: Nov. 13, 2007

(54) PROJECTING APPARATUS AND PROJECTING AND DISPLAYING APPARATUS

(75) Inventor: Atsuo Inoue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 293 days.

(21) Appl. No.: 11/078,337

(22) Filed: Mar. 14, 2005

(65) Prior Publication Data
US 2005/0206849 A1   Sep. 22, 2005

(30) Foreign Application Priority Data
Mar. 18, 2004   (JP) .............. 2004-078656

(51) Int. Cl.
*G03B 21/00* (2006.01)
*G03B 21/14* (2006.01)
*G03B 21/20* (2006.01)
*G03B 21/28* (2006.01)

(52) U.S. Cl. ............................ 353/31; 353/33; 353/81; 353/84; 353/69; 353/98; 353/102; 349/8; 349/9

(58) Field of Classification Search ................ 353/20, 353/31, 33, 34, 81, 82, 84, 98, 102, 69, 99; 349/8, 9
See application file for complete search history.

(56) References Cited

U.S. PATENT DOCUMENTS 6,972,810 B2 * 12/2005 Magarill et al. ............... 349/8

2002/0191235 A1 * 12/2002 O'Connor et al. ............. 359/9

FOREIGN PATENT DOCUMENTS

| JP | 3-216638 | 9/1991 |
| JP | 6-222301 | 8/1994 |
| JP | 10-319351 | 12/1998 |
| JP | 11-119183 | 4/1999 |
| JP | 2001-5098 | 1/2001 |

* cited by examiner

*Primary Examiner*—Melissa Jan Koval
(74) *Attorney, Agent, or Firm*—Oblon, Spivak, McClelland, Maier & Neustadt, P.C.

(57) ABSTRACT

The present invention includes a light source which emits a plurality of lights having different wavelength areas, a plurality of image forming devices which are arranged on respective optical paths for the lights emitted by the light source and which are irradiated with the lights to form images via the lights, magnifying devices which process and magnify the respective images formed by the image forming devices to form magnified images, synthesizing devices placed on respective optical paths for the lights via which the magnified images are transmitted, the synthesizing devices superimposing the lights on one another to synthesize the magnified images together to form a synthesized image, and a projection lens placed on an optical path for the light formed by the synthesizing device to project the light.

18 Claims, 4 Drawing Sheets

PROJECTING APPARATUS AND PROJECTING AND DISPLAYING APPARATUS

CROSS-REFERENCE TO RELATED APPLICATIONS

This application is based upon and claims the benefit of priority from prior Japanese Patent Application No. 2004-078656, filed Mar. 18, 2004, the entire contents of which are incorporated herein by reference.

BACKGROUND OF THE INVENTION

1. Field of the Invention

The present invention relates to a projecting apparatus and a projecting and displaying apparatus which synthesize images formed on a plurality of image forming devices, such as liquid crystal cells, to project and display the synthesized image on a projection surface such as a screen.

2. Description of the Related Art

A liquid crystal projecting apparatus is known which synthesizes images formed on a plurality of liquid crystal cells to project and display the synthesized image on a projection surface such as a screen.

FIG. 6 is a diagram showing the configuration of a conventional liquid crystal projecting apparatus. FIG. 7 is a diagram illustrating that on-axis chromatic aberration may occur with a conventional liquid crystal projecting apparatus. FIG. 8 is a diagram illustrating that magnification chromatic aberration may occur with the conventional liquid crystal projecting apparatus.

As shown in FIG. 6, in this liquid crystal projecting apparatus, a white light source 100 emits white light w. Then, an illuminating optical system 101 and a polarizing optical system 102 adjust the form of a luminous flux and the state of polarization.

An interference filter 103 then separates the white light w for which the shape of the luminous flux and the state of polarization have been adjusted, into lights R, G, B in three respective wavelength areas corresponding to red, green, and blue. The red, green, and blue lights R, G, and B are incident on first prisms 104a to 104c to illuminate liquid crystal cells 105a to 105c arranged opposite the first prisms 104a to 104c.

When the liquid crystal cells 105a to 105c are illuminated with the lights R, G, and B, images corresponding to the lights R, G, and B are displayed on the liquid crystal cells 105a to 105c, respectively. The images displayed on the liquid crystal cells 105a to 105c pass through the first prisms 104a to 104c, respectively. A second prism 106 then superimposes the images on one another. The resulting image is projected and displayed by a projection lens 107 on a projection surface 108 such as a screen.

However, with a liquid crystal projecting apparatus configured as described above, when the lights R, G, and B pass through the projection lens 107, a difference in wavelength between the lights may cause on-axis chromatic aberration or magnification chromatic aberration, as shown in FIGS. 7 and 9. As a result, the image projected on the projection surface 108 may appear blurred.

Thus, according to the prior art, the projection lens 107 is composed of a plurality of lenses and the shapes, materials, and arrangement of the lenses are improved so as to correct the on-axis chromatic aberration or the magnification chromatic aberration.

However, the projection lens 107 configured as described above is disadvantageous in that for example, the design is complex, is large in size, has a large number of constituent lenses, has a low degree of freedom in selecting the materials of the lenses, and is heavy. This contributes to increasing the size, weight, and cost of the whole apparatus.

Thus, a liquid crystal projecting apparatus has been disclosed in which the spacing between each of the liquid crystal cells and the second prism varies (see, for example, Jpn. Pat. Appln. KOKAI Publication No. 2001-5098). According to this liquid crystal projecting apparatus, even with a projection lens not having a function for correcting chromatic aberration, an image on the projection surface can be prevented from undergoing chromatic aberration by arranging the liquid crystal cells so that the optical distances of each type of light between the liquid crystal cells and the projection lens are equal.

However, magnification chromatic aberration, which may occur in the image on the projection surface, cannot be corrected even by arranging the liquid crystal cells as previously described.

BRIEF SUMMARY OF THE INVENTION

In view of the above problems, it is an object of the present invention to provide a projecting apparatus that can correct on-axis chromatic aberration and magnification chromatic aberration which may occur in an image on a projection surface without complicating the design, reducing the degree of freedom in selecting materials, increasing the number of constituent lenses, or increasing the size or weight.

To solve the above problems and accomplish this object, a projecting apparatus and a projecting and displaying apparatus are configured as described below.

(1) A projecting apparatus comprises a light source which emits a plurality of lights having different wavelength areas, a plurality of image forming devices which are arranged on respective optical paths for the lights emitted by the light source and which are irradiated with the lights to form images via the lights, magnifying devices which process and magnify the respective images formed by the image forming devices to form magnified images, synthesizing devices placed on respective optical paths for the lights via which the magnified images are transmitted, the synthesizing devices superimposing the lights on one another to synthesize the magnified images together to form a synthesized image, and a projection lens placed on an optical path for the light formed by the synthesizing device to project the light.

(2) In the projecting apparatus set forth in (1), an optical distance of each light between each of the plurality of image forming apparatuses and a projection surface can be adjusted.

(3) In the projecting apparatus set forth in (1), the light source has a white light source which emits white light and an interference filter which separates the white light emitted by the white light source into red light, green light, and blue light.

(4) In the projecting apparatus set forth in (1), the light source has a first monochromatic light source that emits red light, a second monochromatic light source that emits green light, and a third monochromatic light source that emits blue light.

(5) In the projecting apparatus set forth in (1), the light source has a first monochromatic light source that emits red light, a second monochromatic light source that emits green light, a third monochromatic light source that emits blue light, a superimposition lens which superimposes the red light, green light, and blue light emitted by the first to third monochromatic light sources to form white light, and an interference filter which separates the white light formed by the superimposition lens into red light, green light, and blue light.

(6) In the projecting apparatus set forth in (1), a distance between the image forming device and synthesizing device for each light increases in order of blue, green, and red.

(7) In the projecting apparatus set forth in (1), a magnification for the magnifying device present for each color increases in order of blue, green, and red.

(8) In the projecting apparatus set forth in (4), each of the first to third monochromatic light sources is a laser, a light emitting diode, or a laser diode.

(9) In the projecting apparatus set forth in (5), each of the first to third monochromatic light sources is a laser, a light emitting diode, or a laser diode.

(10) A projecting and displaying apparatus comprises a light source which emits a plurality of lights having different wavelength areas, a plurality of image forming devices which are arranged on respective optical paths for the lights emitted by the light source and which are irradiated with the lights to form images via the lights, magnifying devices which process and magnify the respective images formed by the image forming devices to form magnified images, synthesizing devices placed on respective optical paths for the lights via which the magnified images are transmitted, the synthesizing devices superimposing the lights on one another to synthesize the magnified images together to form a synthesized image, a projection lens placed on an optical path for the light formed by the synthesizing device to project the light, and a projection surface which receives the light projected by the projection lens to display the synthesized image.

(11) In the projecting and displaying apparatus set forth in (10), an optical distance of each light between each of the plurality of image forming apparatuses and the projection surface can be adjusted.

(12) In the projecting and displaying apparatus set forth in (10), the light source has a white light source which emits white light and an interference filter which separates the white light emitted by the white light source into red light, green light, and blue light.

(13) In the projecting and displaying apparatus set forth in (10), the light source has a first monochromatic light source that emits red light, a second monochromatic light source that emits green light, and a third monochromatic light source that emits blue light.

(14) In the projecting and displaying apparatus set forth in (10), the light source has a first monochromatic light source that emits red light, a second monochromatic light source that emits green light, a third monochromatic light source that emits blue light, a superimposition lens which superimposes the red light, green light, and blue light emitted by the first to third monochromatic light sources to form white light, and an interference filter which separates the white light formed by the superimposition lens into red light, green light, and blue light.

(15) In the projecting and displaying apparatus set forth in (10), a distance between the image forming device and synthesizing device for each light increases in order of blue, green, and red.

(16) In the projecting and displaying apparatus set forth in (10), a magnification for the magnifying device present for each color increases in order of blue, green, and red.

(17) In the projecting and displaying apparatus set forth in (13), each of the first to third monochromatic light sources is a laser, a light emitting diode, or a laser diode.

(18) In the projecting and displaying apparatus set forth in (14), each of the first to third monochromatic light sources is a laser, a light emitting diode, or a laser diode.

(19) In the projecting and displaying apparatus set forth in (15), each of the first to third monochromatic light sources is a laser, a light emitting diode, or a laser diode.

(20) In the projecting and displaying apparatus set forth in (16), each of the first to third monochromatic light sources is a laser, a light emitting diode, or a laser diode.

The present invention can correct on-axis chromatic aberration and magnification chromatic aberration which may occur in an image on a projection surface without complicating a design, reducing the degree of freedom in selecting materials, increasing the number of constituent lenses, or increasing the size or weight.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to the drawings, description will be given below of the best mode for carrying out the present invention.

Figure 1:
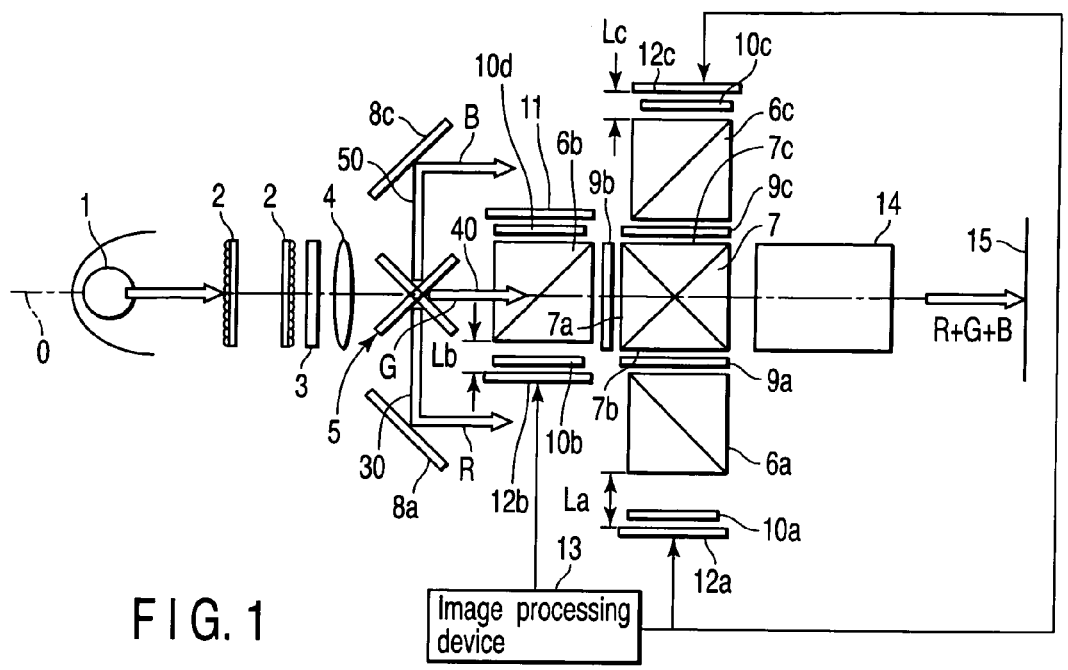
FIG. 1 is a diagram showing the configuration of a liquid crystal projecting apparatus according to an embodiment of the present invention.

FIG. 1 is a diagram showing the configuration of a liquid crystal projecting apparatus (projecting and displaying apparatus) according to an embodiment of the present invention.

In FIG. 1, reference numerals 1, 2, 3, 4, and 5 denote a white light source, a fly eye lens, and a polarizing optical element, an superimposition lens and an interference filter, respectively. Reference numerals 6a, 6b, and 6c denote prisms. Reference numeral 7 denotes a cross dichroic prism (synthesizing device). References 8a and 8c denote first reflectors. Reference numerals 9a, 9b, and 9c denote half wave-length plates. Reference numerals 10a, 10b, 10c, and 10d denote quarter wavelength plates. Reference numeral 11 denotes a second reflector. Reference numerals 12a, 12b, and 12c denote liquid crystal cells (image forming devices). Reference numerals 13, 14, and 15 denote an image processing device (magnifying device), a projection lens, and a screen (projection surface), respectively.

The white light source 1, the fly eye lens 2, the polarizing optical element 3, the superimposition lens 4, the interference filter 5, the cross dichroic prism 7, the projection lens 14, and the screen 15 are arranged in parallel on an axis O.

The cross dichroic prism 7 is formed substantially cubic. The cross dichroic prism 7 is placed so that the center of its first surface 7a and the axis O cross at substantially right angles.

The prisms 6a and 6c are arranged opposite a second surface 7b and a third surface 7c of the cross dichroic prism 7 which are parallel with each other and which cross the first surface 7a. The prism 6b is placed opposite the first surface 7a of the cross dichroic prism 7.

The liquid crystal cells 12a, 12b, and 12c are arranged so that the spacings between the prisms 6a, 6b, and 6c and the corresponding liquid crystal cells 12a, 12b, and 12c have predetermined values La, Lb, and Lc, respectively.

La, Lb, and Lc can be set so that after passing through the liquid crystal cells 12a, 12b, and 12c, lights R, G, and B (described later) travel an equal optical distance before being projected on the screen 15. La>Lb>Lc is satisfied.

The white light source 1 is an incandescent lamp, a cold cathode tube, a halogen lamp, a mercury lamp, a high pressure mercury lamp, a white light emitting diode, or the like.

In this liquid crystal projecting apparatus, white light w emitted by the white light source 1 passes through the fly eye lens 2, the polarizing optical element 3, and the superimposition lens 4. The white light w is incident on the interference filter 5. In this case, when the white light w passes through the fly eye lens 2 and superimposition lens 4, the shape of its luminous flux is adjusted. When the white light w passes through the polarizing optical element 3, the state of its polarization is adjusted.

After entering the interference filter 5, the white light w is separated into lights R, G, and B (red light, green light, and blue light) having wavelength areas corresponding to red, green, and blue. The lights R, G, and B travel along optical paths 30, 40, and 50, respectively. The lights R and B, which travel along the optical paths 30 and 50, are reflected by the first reflectors 8a and 8c, respectively. The lights R and B then enter the prisms 6a and 6c. On the other hand, the light G, which travels along the optical path 40, is incident on the prism 6b.

After entering the prisms 6a and 6c, the lights R and B are reflected by an internal refracting interface in a substantially perpendicular direction. To enhance the reflectance of the prisms to a maximum, the lights 6a and 6c may be applied to internal refracting interface at an angle other than 45. The lights R and B then pass through the quarter wavelength plates 10a and 10c. The lights R and B then enter the liquid crystal cells 12a and 12c, respectively. Thus, images corresponding to the lights R and B are formed on the liquid crystal cells 12a and 12c, respectively.

On the other hand, after entering the prism 6b, the light G is reflected by an internal refracting interface in a substantially perpendicular direction. To enhance the reflectance of the prism 6b to a maximum, the light G may be applied to internal refracting interface at an angle other than 45. The light G then passes through the quarter wavelength plate 10d. The light G is then reflected by the reflector 11 in the opposite direction. The light G reflected by the second reflector 11 passes through the quarter wavelength plate 10d. The light G then enters the prism 6b again.

Since the light G passes through the quarter wavelength plate 10d twice, its phase is shifted by $\pi/2$[rad]. Accordingly, the light G is transmitted without being reflected by the refracting interface of the prism 6b. After being transmitted through the refracting interface, the light G passes through the quarter wavelength plate 10b. The light G then enters the liquid crystal cell 12b. Thus, an image corresponding to the light G is formed on the liquid crystal cell 12b.

The images formed on the liquid crystal cells 12a, 12b, and 12c are magnified by the image processing device 13 using magnifications Ga, Gb, and Gc (Ga>Gb>Gc is satisfied) for the lights R, G, and B. The resulting magnified images are displayed on the respective liquid cells 12a, 12b, and 12c. After passing through the liquid crystal cells 12a, 12b, and 12c, the lights R, G, and B have sectional shapes corresponding to the magnified images.

The magnifications Ga, Gb, and Gc are set so that when the lights R, G, and B having passed through the liquid cells 12a, 12b, and 12c are projected on the screen 15, the images obtained have an equal size. For example, if the image corresponding to the light G formed on the liquid crystal cell 12b is used as a reference (Gb=1), the image corresponding to the light R formed on the liquid crystal cell 12a is magnified using Ga>1. The image corresponding to the light B formed on the liquid crystal cell 12c is magnified using Gc<1. The reference for magnification may be the image corresponding to the light R or B instead of the image corresponding to the light G.

After passing through the liquid crystal cells 12a and 12c, the lights R and B pass through the quarter wavelength plates 10a and 10c, respectively. The lights R and B then enter the prisms 6a and 6c, respectively. Since the lights R and B pass through the quarter wavelength plates 10a and 10c twice, their phases are shifted by $\pi/2$[rad]. Accordingly, the lights R and B are transmitted without being reflected by the refracting interfaces of the prisms 6a and 6c. After being transmitted through the refracting interfaces, the lights R and B pass through the quarter wavelength plates 9a and 9c, respectively. The lights R and B then enter the cross dichroic prism 7.

On the other hand, after passing through the liquid crystal cell 12b, the light G passes through the quarter wavelength plate 10b. The light G then enters the prism 6b. Since the light G passes through the quarter wavelength plate 10b twice, its phase is shifted by $\pi/2$[rad]. Accordingly, the light G is reflected by the refracting interface of the prism 6b in a substantially perpendicular direction. To enhance the reflectance of the prism 6b to a maximum, the light G may be applied to internal refracting interface at an angle other than 45. After being reflected by the refracting surface, the light G passes through the half wavelength plate 9b. The light G then enters the cross dichroic prism 7.

The cross dichroic prism 7 superimposes the incident lights R, G, and B on one another to synthesize the magnified images corresponding images corresponding to the lights R, G, and B. One synthesized image is thus formed. The light R+G+B obtained by the superimposition through the dichroic prism 7 has a sectional shape corresponding to the synthesized image.

The light R+G+B from the cross dichroic prism 7 passes through the projection lens 14 and is then projected on the screen 15. Thus, the synthesized image is displayed on the screen 15 in color.

With the liquid crystal projecting apparatus according to the present embodiment, the spacings (La, Lb, and Lc) between the prisms 6a, 6b, and 6c and the corresponding liquid crystal cells 12a, 12b, and 12c are adjusted so that after passing through the liquid crystal cells 12a, 12b, and 12c, the lights R, G, and B travel an equal optical distance before being projected on the screen 15.

This serves to correct possible on-axis chromatic aberration resulting from a difference in wavelength between the lights R and G and B. Therefore, a clear image can be projected on the screen.

Figure 2:
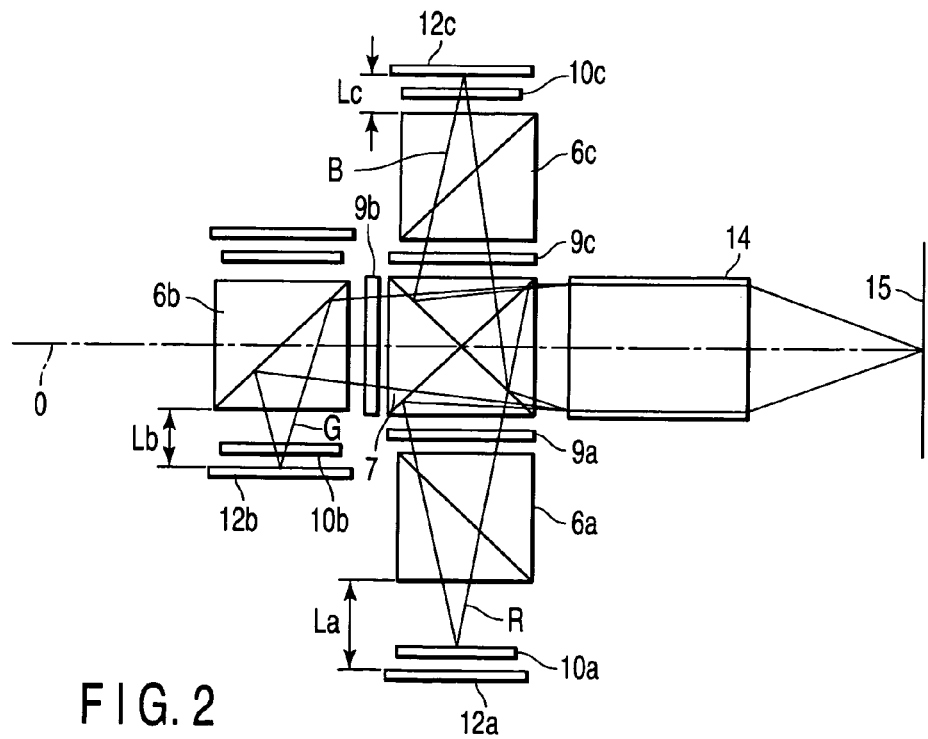
FIG. 2 is a diagram illustrating that the liquid crystal projecting apparatus according to the embodiment has corrected on-axis chromatic aberration.

FIG. 2 is a diagram illustrating that the liquid crystal projecting apparatus according to the embodiment has corrected on-axis chromatic aberration. FIG. 2 indicates that all the focuses of the lights R, G, and B on the optical axis are located on the screen. This indicates that the on-axis chromatic aberration has been corrected.

Further, the images formed on the liquid crystal cells 12a, 12b, and 12c are magnified by the image processing device 13 using the magnifications corresponding to the lights R, G, and B.

This serves to correct possible on-axis chromatic aberration resulting from a difference in wavelength between the lights R and G and B. Therefore, a clearer image can be projected on the screen.

Figure 3:
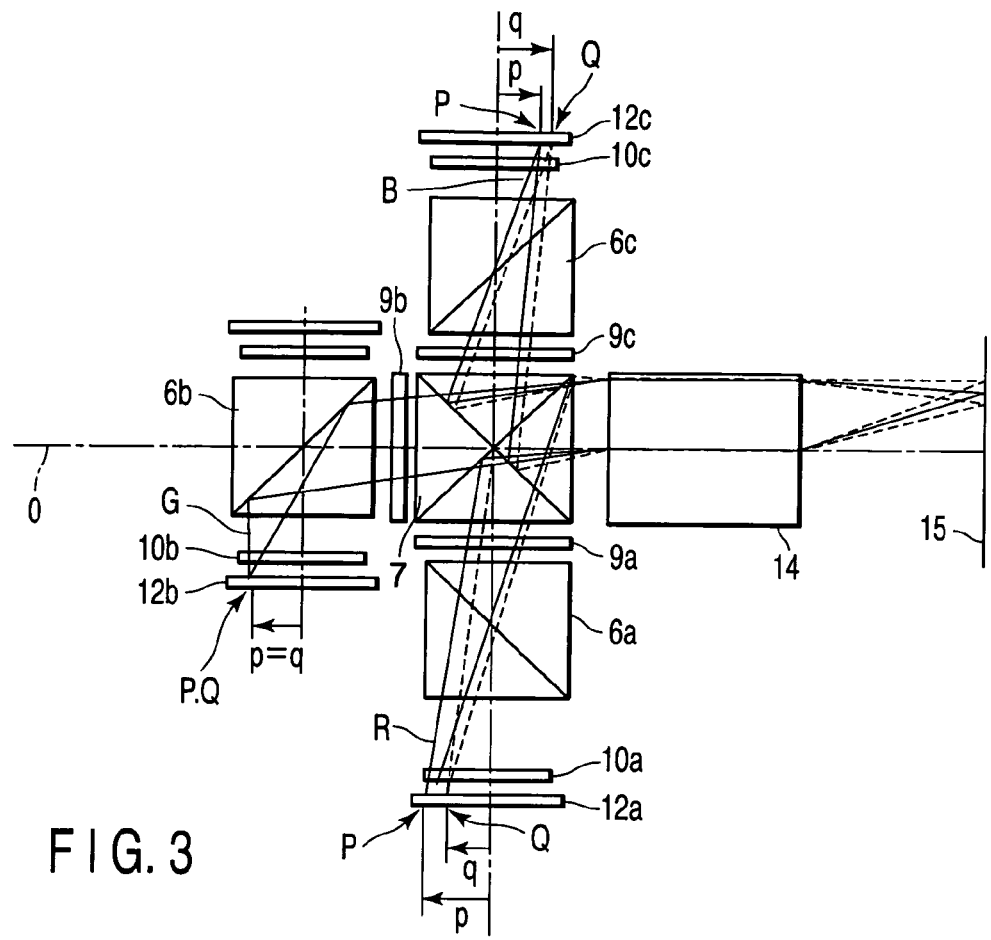
FIG. 3 is a diagram illustrating that the liquid crystal projecting apparatus according to the embodiment has corrected magnification chromatic aberration.

FIG. 3 is a diagram illustrating that the liquid crystal projecting apparatus according to the embodiment has corrected magnification chromatic aberration. In FIG. 3, points P and Q on the image displayed on the liquid crystal cell 12a are the same as those on the image displayed on the liquid crystal cells 12c. The point P corresponds to the image after magnification. The point Q corresponds to the image before magnification. Further, solid lines indicate optical paths for the lights R, G, and B emitted from the point P. Dotted lines indicate optical paths for the lights R, G, and B emitted from the point Q. That is, as shown in FIG. 3, the liquid crystal cell 12a magnifies the image so that p/q (=Ga) >1. The liquid crystal cell 12b magnifies the image so that p/q (=Gb)=1. The liquid crystal cell 12c magnifies the image so that p/q (=Gc) <1.

FIG. 3 shows that the same part of the images is formed at the same position on the screen 15. This indicates that magnification chromatic aberration has been corrected.

The present invention is not limited to the above embodiment. In implementation, the present invention can be embodied by varying the components of the embodiment without departing from the spirit of the invention. Further, various inventions can be formed by appropriately combining a plurality of the components disclosed in the embodiment.

Figure 4:
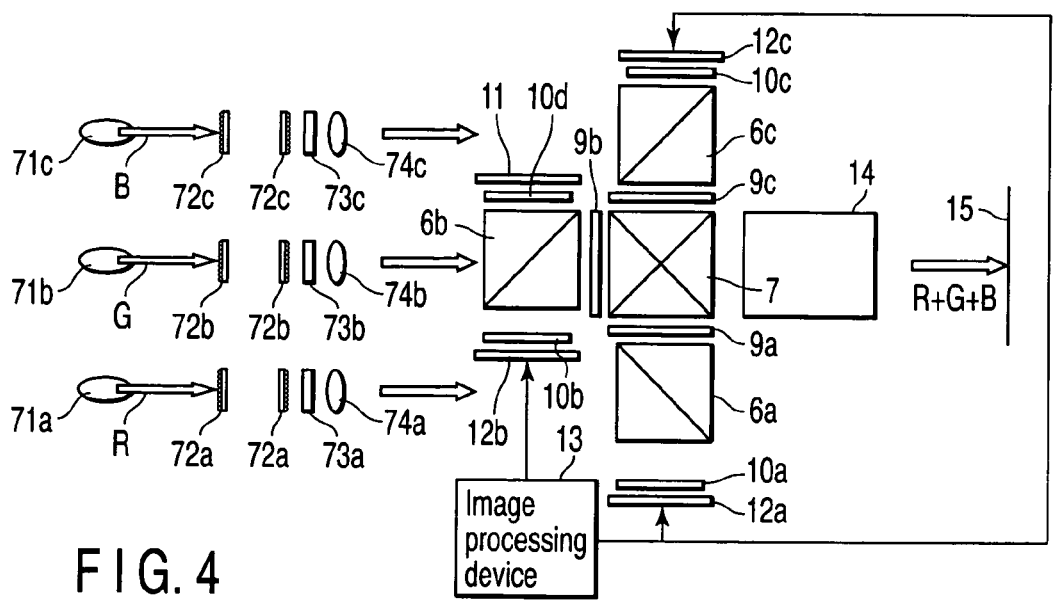
FIG. 4 is a diagram showing the configuration of a liquid crystal projecting apparatus according to a first variation of the embodiment.

For example, as shown in FIG. 4, it is possible to use, in place of the white light source 1, a first to third monochromatic light sources 71a, 71b, and 71c having wavelength areas for red, green, and blue, which are the three primary colors of light.

In this case, a fly eye lens 72a, 72b, or 72c, a polarizing optical element 73a, 73b, or 73c, and a superimposition lens 74a, 74b, or 74c must be arranged on an optical path for each of the lights R, G, and B emitted from the first to third monochromatic light sources 71a, 71b, and 71c. Each of the first to third monochromatic light sources 71a, 71b, and 71c is a laser, laser diode, a light emitting diode, or the like.

Figure 5:
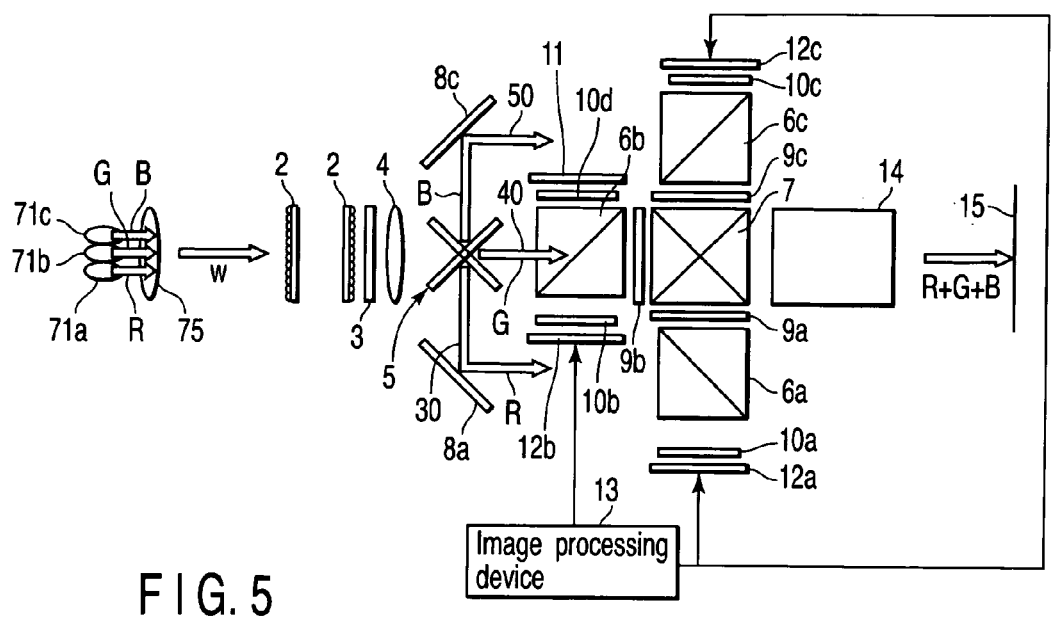
FIG. 5 is a diagram showing the configuration of a liquid crystal projecting apparatus according to a second variation of the embodiment.
Figure 6:
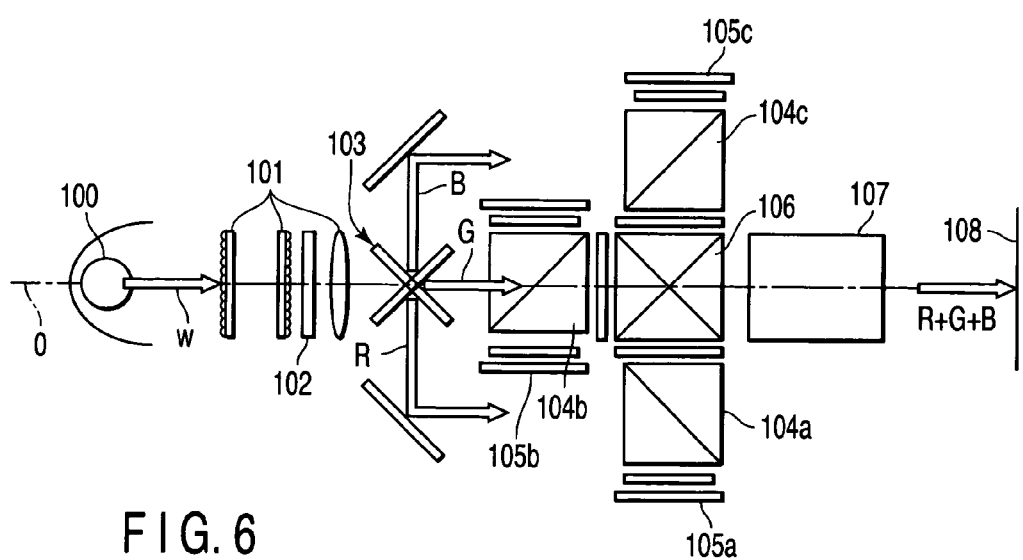
FIG. 6 is a diagram showing the configuration of a conventional liquid crystal projecting apparatus.
Figure 7:
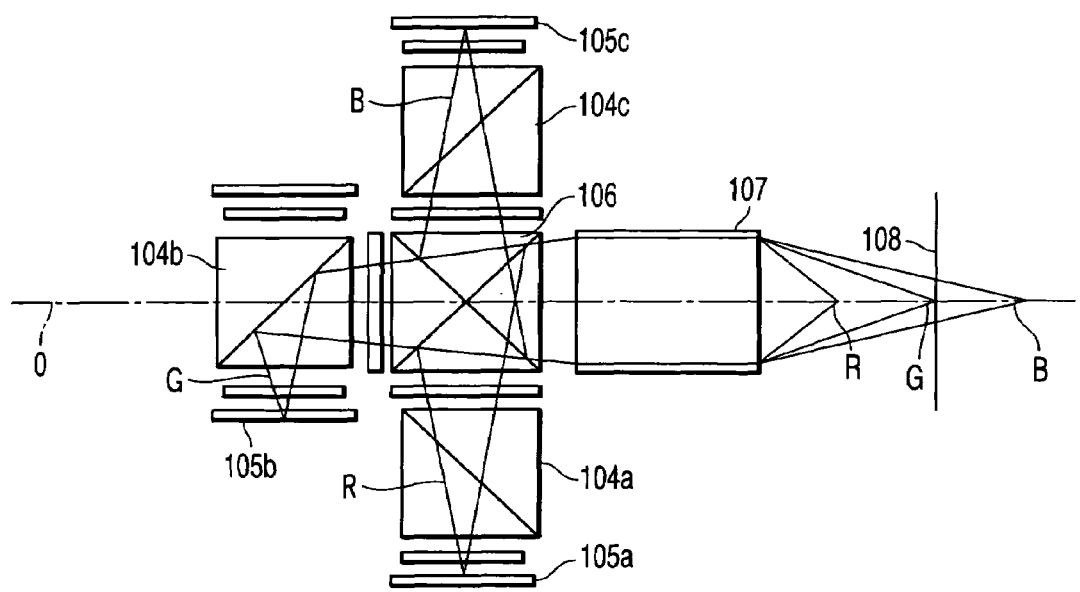
FIG. 7 is a diagram illustrating that on-axis chromatic aberration may occur with a conventional liquid crystal projecting apparatus.
Figure 8:
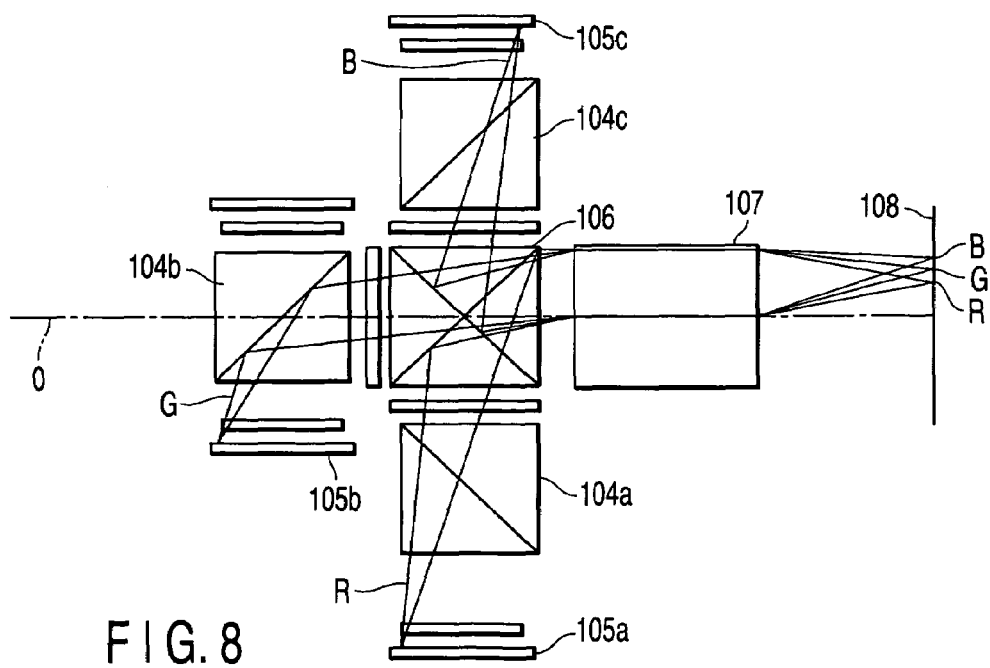
FIG. 8 is a diagram illustrating that magnification chromatic aberration may occur with the conventional liquid crystal projecting apparatus.

Further, it is also possible to use, in place of the white light source 1, the first to third monochromatic light sources 71a, 71b, and 71c having the wavelength areas for red, green, and blue, which are the three primary colors of light, as shown in FIG. 5. In this case, a superimposition lens 75 is used to superimpose the lights R, G, and B emitted by the first to third monochromatic light sources 71a, 71b, and 71c, on one another to form white light w. Then, the white like w is separated into red, green, and blue lights R, G, and B again. Each of the first to third monochromatic light sources 71a, 71b, and 71c is a laser, laser diode, a light emitting diode, or the like.

Further, the present invention is not limited to the projector that projects and displays images on the screen 15 as previously described. The present invention may be used as, for example, a projecting apparatus that displays images on a television screen.

According to the present embodiment, the liquid crystal cells 12a, 12b, and 12c are used as image forming device. However, the type of the image forming devices is not particularly limited provided that the devices are configured to display an image by allowing light from a light source such as a backlight to pass through, as in the case of liquid crystal display devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projecting apparatus comprising:
   a light source including an interference filter which emits a plurality of lights having different wavelength areas;
   a plurality of image forming devices which are arranged on respective optical paths for the lights emitted by the light source and which are irradiated with the lights to form images via the lights;
   magnifying devices which process and magnify the respective images formed by the image forming devices to form magnified images;
   a synthesizing device which synthesizes the magnified images to form a synthesized image by superimposing the lights on one another; and
   a projection lens placed on an optical path for the light formed by the synthesizing device to project the light.

2. The projecting apparatus according to claim 1, wherein an optical distance of each light between each of the plurality of image forming apparatuses and a projection surface via the projection lens can be adjusted.

3. The projecting apparatus according to claim 1, wherein:
   the light source has a white light source which emits white light; and
   the interference filter separates the white light emitted by the white light source into red light, green light, and blue light.

4. A projecting apparatus comprising:
a light source including a first monochromatic light source that emits red light, a second monochromatic light source that emits green light, and a third monochromatic light source that emits blue light;
a plurality of image forming devices which are arranged on respective optical paths for the lights emitted by the first to third light sources and which are irradiated with the lights to form images via the lights;
magnifying devices which process and magnify the respective images formed by the image forming devices to form magnified images;
a synthesizing device which synthesizes the magnified images to form a synthesized image by superimposing the lights on one another;
a projection lens placed on an optical path for the light formed by the synthesizing device to project the light; and
an adjusting device which adjusts an optical distance between each of the plurality of image forming apparatuses and a projection surface via the projection lens can be adjusted.

5. The projecting apparatus according to claim 1, wherein: the light source has
a first monochromatic light source that emits red light;
a second monochromatic light source that emits green light;
a third monochromatic light source that emits blue light; and
a superimposition lens which superimposes the red light, green light, and blue light emitted by the first to third monochromatic light sources to form white light; and
the interference filter separates the white light formed by the superimposition lens into red light, green light, and blue light.

6. The projecting apparatus according to claim 1, wherein a distance between the image forming device and synthesizing device for each light increases in order of blue, green, and red.

7. The projecting apparatus according to claim 1, wherein magnification for the magnifying device present for each color increases in order of blue, green, and red.

8. The projecting apparatus according to claim 4, wherein each of the first to third monochromatic light sources is a laser, a light emitting diode, or a laser diode.

9. The projecting apparatus according to claim 5, wherein each of the first to third monochromatic light sources is a laser, a light emitting diode, or a laser diode.

10. A projecting and displaying apparatus comprising:
a light source including an interference filter which emits a plurality of lights having different wavelength areas;
a plurality of image forming devices which are arranged on respective optical paths for the lights emitted by the light source and which are irradiated with the lights to form images via the lights;
magnifying devices which process and magnify the respective images formed by the image forming devices to form magnified images;
a synthesizing device which synthesizes the magnified images to form a synthesized image by superimposing the lights on one another;
a projection lens placed on an optical path for the light formed by the synthesizing device to project the light; and
a projection surface which receives the light projected by the projection lens to display the synthesized image.

11. The projecting and displaying apparatus according to claim 10, wherein an optical distance of each light between each of the plurality of image forming apparatuses and the projection surface via the projection lens can be adjusted.

12. The projecting and displaying apparatus according to claim 10, wherein the light source has a white light source which emits white light and the interference filter separates the white light emitted by the white light source into red light, green light, and blue light.

13. A projecting apparatus comprising:
a light source including a first monochromatic light source that emits red light, a second monochromatic light source that emits green light, and a third monochromatic light source that emits blue light;
a plurality of image forming devices which are arranged on respective optical paths for the lights emitted by the first to third light sources and which are irradiated with the lights to form images via the lights;
magnifying devices which process and magnify the respective images formed by the image forming devices to form magnified images;
a synthesizing device which synthesizes the magnified images to form a synthesized image by superimposing the lights on one another;
a projection lens placed on an optical path for the light formed by the synthesizing device to project the light;
a projection surface which receives the light projected by the projection lens to display the synthesized image; and
an adjusting device which adjusts an optical distance between each of the plurality of image forming apparatuses and a projection surface via the projection lens can be adjusted.

14. The projecting and displaying apparatus according to claim 10, wherein the light source has a first monochromatic light source that emits red light, a second monochromatic light source that emits green light, a third monochromatic light source that emits blue light, and a superimposition lens which superimposes the red light, green light, and blue light emitted by the first to third monochromatic light sources to form white light; and the interference filter which separates the white light formed by the superimposition lens into red light, green light, and blue light.

15. The projecting and displaying apparatus according to claim 10, wherein a distance between the image forming device and synthesizing device for each light increases in order of blue, green, and red.

16. The projecting and displaying apparatus according to claim 10, wherein a magnification for the magnifying device present for each color increases in order of blue, green, and red.

17. The projecting and displaying apparatus according to claim 13, wherein each of the first to third monochromatic light sources is a laser, a light emitting diode, or a laser diode.

18. The projecting and displaying apparatus according to claim 14, wherein each of the first to third monochromatic light sources is a laser, a light emitting diode, or a laser diode.

* * * * *